United States Patent [19]

Reinecke

[11] 4,058,347
[45] Nov. 15, 1977

[54] LOAD-RESPONSIVE LINKING DEVICE FOR VEHICLE BRAKE PRESSURE REGULATORS

[75] Inventor: Erich Reinecke, Beinhorn, Germany

[73] Assignee: WABCO Westinghouse GmbH, Hannover, Germany

[21] Appl. No.: 705,717

[22] Filed: July 15, 1976

[30] Foreign Application Priority Data

July 16, 1975  Germany .............................. 2531756

[51] Int. Cl.² .............................................. B60T 8/18
[52] U.S. Cl. .................... 303/22 R; 188/195
[58] Field of Search ................. 303/22 R, 22 A, 6 C, 303/84 A, 84 R, 23 A, 23 R; 188/195, 349

[56] References Cited

U.S. PATENT DOCUMENTS

| | | | |
|---|---|---|---|
| 3,191,999 | 6/1965 | Cordiano | 303/22 R |
| 3,362,758 | 1/1968 | Goerke et al. | 303/22 R |
| 3,695,735 | 10/1972 | Guettier | 303/22 R |
| 3,701,616 | 10/1972 | Kawai | 303/22 R |

Primary Examiner—Trygve M. Blix
Assistant Examiner—Douglas C. Butler
Attorney, Agent, or Firm—R. S. Visk; R. W. McIntire, Jr.

[57] ABSTRACT

A vehicle load responsive linking device for controlling operation of a brake pressure regulator in effecting supply of pressurized fluid to the brake system at a pressure commensurate with the prevailing vehicle load, and including a fulcrumed lever for actuating the brake pressure regulator according to a resultant force of a pair of opposing spring forces exerted thereon by respective tensionally opposingly disposed springs having adjacent ends secured to the lever and the opposite ends secured to sprung and unsprung portions, respectively, of the vehicle, the distance between the sprung and unsprung portions, as determined by the vehicle load, determining the tension of the springs, which tension acts to dampen and isolate axle vibrations from the pressure regulator device.

8 Claims, 1 Drawing Figure

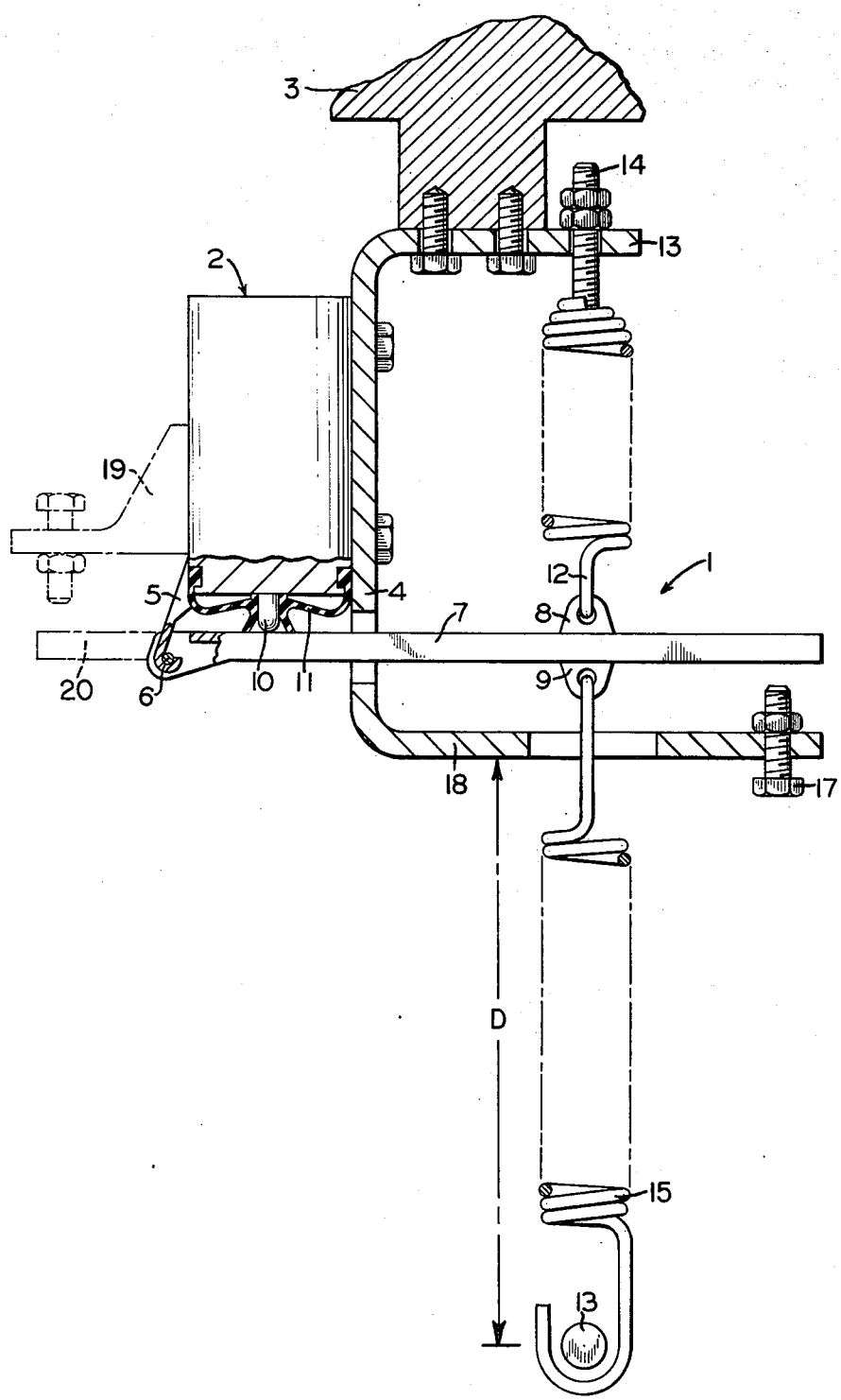

LOAD-RESPONSIVE LINKING DEVICE FOR VEHICLE BRAKE PRESSURE REGULATORS

BACKGROUND OF THE INVENTION

Some presently known load-responsive linking devices for use with brake pressure regulators of vehicles may have a fulcrum lever which is pivotal about a fulcrum connected to the regulator housing and is subjected to the tensional influence of a primary spring which is connected thereto between the free end of the lever and the point of connection of the regulator housing and whose initial tension is variable under the tensional influence of a counteracting secondary spring according to the distance between the sprung vehicle body and the unsprung vehicle axle, said lever abutting against a piston rod elongation of the brake power regulator for operating the latter.

As is known, the purpose of a brake pressure regulator when used in the manner above set forth in connection with a load-responsive linking device of the above-mentioned type, is to increase brake pressure in proportion to increase of vehicle load and to decrease said brake pressure in proportion to decrease of vehicle load, in accordance with the initial tension of the primary spring as varied by the influence of the secondary spring according to the distance between the sprung vehicle body and the unsprung vehicle axle.

Presently known load-responsive linking devices of the type described above, in which the fulcrum lever of the brake pressure regulator is subjected to opposing forces of a primary spring anchored to the sprung vehicle body through the regulator piston, which is usually mounted on the vehicle body, and a secondary spring anchored to the unsprung vehicle axle, have the disadvantage that the axle oscillations which occur during operation of the vehicle and may be of considerable amplitude, are transmitted to the lever of the brake pressure regulator by way of the secondary spring, thus subjecting both springs to considerable alternating stresses, which especially in the event of a failure of the primary spring acting on the regulator piston via the fulcrum lever, would affect the safety of the vehicle, because the brake pressure to be obtained for effective braking could no longer be built up in the associated brake circuit, and which alternating stresses would further subject the linking points of the linking device and the parts of the brake pressure regulator to increased wear.

SUMMARY OF THE INVENTION

The object of the invention is to provide a load-responsive linking device of the type described above which does not allow the oscillations of greater amplitude occurring during vehicle operation to be fully transmitted to the primary spring acting on the regulator piston through the fulcrum lever nor to any parts of the brake power regulator.

This object is reached, according to the invention, in that there is disposed either on the regulator housing or on a vehicle part fixedly attached to the regulator housing a stop limiting the angular displacement of the lever effected by the secondary spring after operation of the pressure regulator in effecting brake pressure to the brake system.

The advantages which can be obtained with the load-dependent linking device, made in accordance with the invention, for brake pressure regulators reside particularly in the fact that limiting the angular displacement of the lever effected by the secondary spring and consequently limiting the area of movement of the primary spring acting upon the regulator piston (through the fulcrum lever making abutting contact with the end of a piston rod thereof) not only practically precludes overstressing and, due to axle vibrations, a resultant risk of possible breaking of this primary spring, which is essential for the safety of the vehicle, but also permits usage of a primary spring having a weaker coefficient of elasticity to an extent which is advantageous to the delicate follow-up responsiveness of the brake pressure regulator. In addition the fulcrum lever making abutting contact with the piston rod of the brake pressure regulator and acting upon same under the influence of the aforesaid primary spring remains in permanent position against the piston rod of the regulator piston and the dust seal associated with the bore of the piston rod, regardless of the intensity of the axle vibrations, whereby the respective contact surfaces and regulator parts are effectively protected against fouling and, in the case of limitation of angular displacement of the fulcrum lever closely after operation of the brake pressure regulator to the pressure supply position, which results in less movement of the linking device and regulator parts so that they are effectively protected against too rapid wear also.

The arrangement of the stop, as above described, also results in a practically vibration-free lever bearing at the end of the lever pivotally anchored to the brake pressure regulator in spite of the varying effect of the springs linked to the free end of the lever, thus making it possible to make said lever bearing in the form of an open hook and, in view of the permanent possibility of fouling, is thus in effect a self-cleaning bearing which cannot jam.

BRIEF DESCRIPTION OF THE DRAWING

The single FIGURE drawing shows an elevational view, in outline, of an arrangement and form, according to the invention, of a vehicle load-responsive linking device for a brake pressure regulator.

DESCRIPTION AND OPERATION

As shown in the drawing, a load-responsive linking device 1 is operably associated with a brake pressure regulator 2 mounted on a sprung portion of a vehicle body 3, only a fragmentary portion of which is shown, by a C-shaped mounting bracket 4 removably secured to the housing of regulator 2. A support arm 5 formed on the housing of regulator 2 is provided with a bearing 6 in which one end of a fulcrum lever 7 is pivotally supported, said lever having formed between its two ends and on opposite upper and lower sides thereof a pair of linking ears 8 and 9. The end of lever 7 adjacent support bearing 6 is urged into abutting contact with a protruding end of a piston rod 10 extending from the lower end of regulator 2 and simultaneously with a dust seal 11 or flexible protective boot surrounding said protruding end for protecting the bore through which said piston rod extends. A primary spring 12 has one end secured in the upper linking ear 8 of fulcrum lever 7 and the other end adjustably secured by an adjusting screw 13 to an upper horizontal arm 14 of mounting bracket 4. A secondary spring 15 has one end secured to the lower linking ear 9 of fulcrum lever 7 and the other end to an unsprung portion of the vehicle or a linking axle pin 16 attached to the unsprung vehicle axle (not shown), so that the initial tension of primary spring 12, as adjusted by screw 14, changes according to the distance between the unsprung vehicle axle or pin 16 and the sprung vehicle body 3. A screw-threadedly adjustable stop 17 is disposed on the end of a lower horizontal arm 18 of the mounting bracket 4 opposite the free end of lever 7 for limiting pivotal motion of the lever on the side toward secondary spring 15, or in a clockwise direction. Springs 12 and 15 exert oppositely directed tensional forces on fulcrum lever 7 normal to the axis thereof.

Stop 17 may be located on arm 18 opposite any axial point of lever 7 and axially on either side of ear 9 so long as the clockwise pivotal motion of said lever is limited to the extent that piston rod 10 (and, therefore, the piston, not shown, to which the rod is attached) has attained the amount of axial movement (downwardly, as viewed in the drawing) necessary for the brake regulator 2 to carry out its intended function, that is, supply of pressure according to vehicle load.

Since a detailed description of brake pressure regulator 2 is not deemed essential to an understanding of the invention, it suffices to say that said brake pressure regulator may be a conventional type brake pressure supply control valve device including a fixed-stroke operating piston (not shown) which, when actuated in response to fluid pressure acting thereon, effects operation of self-lapping valve means (not shown) included in the brake pressure regulator 2 which is thus operated to a pressure supply disposition for effecting supply of actuating fluid to the brake system (not shown) at a pressure determined by an opposing force acting on said operating piston through piston rod 10, in a manner to be hereinafter disclosed.

Instead of being disposed on lower arm 18 of the mounting bracket 4, stop 17 may also, if desired, be disposed on a bracket 19, shown in broken outline in the drawing, attached to and projecting from the side of regulator 2 opposite the side on which bracket 4 is secured, lever 7 having, in such case, an extended portion or extension 20, also indicated in the drawing in broken outline, extending beyond bearing 6 on the side opposite linking ears 8 and 9.

If stop 17 is located in such position as to be contacted by any point of lever 7 outside that portion of the lever between bearing 6 and linking ear 9, then said bearing, owing to the fact that it would be free of vibration because of the tension of the spring 15 acting thereon, could be in the form of a hook-shaped bearing open on one side and thus be self-cleaning without running the unwanted risk of said lever becoming dislodged therefrom.

Operation of the load-responsive linking device 1 for brake pressure regulator 2 is as follows:

A maximum vehicle load causes maximum downward deflection of vehicle body 3 relative to axle pin 16, and therefore a minimum vertical distance therebetween. Since support bracket 4 is fixed to body 3, the amount of such distance between the vehicle body and axle pin 16 reflecting load deflection, can be measured between said pin and arm 18 of said bracket, such distance being indicated as D in the drawing. Distance D, therefore, is inversely proportional to vehicle load. Under maximum load conditions, the end of lever 7 abutting against piston rod 10 of the brake pressure regulator 2, exerts a maximum force thereon since primary spring 12 is under maximum tension, while secondary spring 15 is practically under no tension. Thus, the opposing force of lever 7 acting on piston rod 10, and, therefore, on the regulator piston (not shown), is proportional to the initial tension of primary spring 12 set according to the highest output of brake pressure regulator 2 commensurate with the respective maximum vehicle load. The force of brake pressure, which is built up during braking of the vehicle during the phase of maximum brake pressure control in the brake circuit (not shown) connected to brake pressure regulator 2, acts on the regulator piston (not shown) in a direction opposite to the force exerted thereon by primary spring 12, thus causing regulator piston rod 10 to move downwardly, to thereby cause clockwise rotation or angular rotation of lever 7, until the pressure output of said brake pressure regulator has reached a value compatible with maximum load. In this extended position of piston rod 10, lever 7 will have been rotated clockwise, allowing for a certain tolerance for return purposes at the beginning of the brake release phase, to an extent necessary for the functioning of the brake pressure regulator 2, and is limited in further clockwise movement by making contact with stop 17 disposed on arm 18 of the mounting bracket 4. When terminating the braking action and due to the decreasing brake pressure, lever 7 is returned to its initial position under the influence of primary spring 12, taking along therewith the regulator piston by way of the piston rod 10.

When the vehicle is partially loaded or empty, distance D between the vehicle axle pin 16 and arm 18 of bracket 4 is greater because there is less downward deflection of the vehicle body. Secondary spring 15 is thus stretched and placed under greater initial tension corresponding to the lesser vehicle load. Under such lower load conditions, lever 7 acts less forcefully against piston rod 10 due to the reduced tension of primary spring 12, and consequently acts upon the regulator piston in accordance with the initial reduced tension of said primary spring, which is partially neutralized by the increased tension of said secondary spring. As was above noted, the operating piston of brake pressure regulator 2 is a fixed-stroke piston, and therefore, even under lesser load conditions, moves the same amount as under maximum load conditions, and therefore, causes the same amount of clockwise displacement of lever 7. But since, as above indicated, lever 7, under lower load conditions, exerts a proportionally lesser force on piston rod 10, the pressure of fluid delivered by pressure regulator 2 is proportionally lower. Clockwise rotation of lever 7 is again limited by stop 17 in the manner above described.

Since the regulator piston stroke required for the operation of the brake power regulator 2 is very short (approx. 0.8 mm plus return clearance), as would be the amount of axial movement of piston rod 10, the axle oscillations occurring during operation of the vehicle, practically speaking, cannot be transmitted to the lever 7 and bearing 6, nor further to primary spring 12 or to the parts of the brake power regulator 2 during the braking or brake release phase, if stop 17 is so accurately disposed as to cause the limiting of clockwise rotation of lever 7 to coincide closely with operation of said pressure regulator to a fluid pressure supply disposition. Nor can axle oscillations be transmitted whether the vehicle is carrying a maximum load, or if it is partially loaded or empty. Thus, bearing 6 and the parts of the brake power regulator 2 are, on account of the minimized movement, protected against rapid wear. Moreover, due to the dampening effect of lever 7 resting against piston rod 10 and thus against the dust seal 11, the several parts of pressure regulator 2 are less apt to malfunction. In addition, primary spring 12, important for the safety of the vehicle, is effectively protected against overstress and possible danger of breaking. In the event of a failure of secondary spring 15 if subjected to excessive stress, the regulator piston acts in accordance with the maximum initial tension of primary spring 12, thus making it possible to attain a braking action on the vehicle corresponding to the setting of brake power regulator 2 commensurate with maximum vehicle load.

Stop 17, being in the form of an adjusting screw adjustably disposed in arm 18 or bracket 19, facilitates accurate setting of the limitation of clockwise rotation of lever 7 to closely coincide with the point at which brake pressure regulator 2 is operated to its fluid pressure supply disposition, and thus makes it possible to hold manufacturing dimensions to closer tolerances.

Having now described the invention what I claim as new and desire to secure by Letters Patent, is:

1. A vehicle load-responsive linking device for use with a vehicle brake pressure regulator operable to a supply disposition for effecting supply of brake actuating fluid, said linking device being operably disposed between a sprung portion and an unsprung portion of the vehicle, on which the brake pressure regulator is mounted, and an unsprung portion of the vehicle and comprising:
   a. a fulcrum lever having one end pivotally supported in a bearing carried on the brake pressure regulator;
   b. a primary spring having one end connected to said sprung portion and the other end connected to said lever at an axial point between said one end and a free end of the lever for exerting a first force thereon in one direction normal to the axis of the lever;
   c. a secondary spring having one end connected to said unsprung portion of the vehicle and the other end connected to said lever at said axial point thereof for exerting a second force thereon in an opposite direction relative to said one direction, said first force being variable according to the distance between the sprung and unsprung portions of the vehicle, according to vehicle load;
   d. a piston rod having one end extending out of the brake pressure regulator, and against which piston rod end said one end of said lever is biased into abutting contact by said first force of the primary spring, said piston rod being axially movable in a direction corresponding to said opposite direction for effecting operation of the brake pressure regulator to said supply disposition and consequent corresponding angular displacement of said lever; and characterized by:
   e. a stop member carried on a bracket portion on the brake pressure regulator, said stop member being abuttingly engageable by said free end of said lever for limiting said angular displacement thereof and, therefore, said axial movement of said piston rod to an amount coinciding with said operation of the brake pressure regulator to said supply disposition.

2. A vehicle load-responsive linking device according to claim 1, characterized in that the stop member is disposed on a lower horizontal arm of a C-shaped mounting bracket by which the brake pressure regulator is secured to the sprung portion of the vehicle.

3. A vehicle load-responsive linking device according to claim 2, characterized in that the stop member is in the form of an adjusting screw screw-threadedly, adjustably disposed in said horizontal arm.

4. A vehicle load-responsive linking device according to claim 3, characterized in that the stop member is disposed in the path of angular displacement of the lever.

5. A vehicle load-responsive linking device according to claim 3, characterized in that the stop member is disposed in the path of angular displacement of said lever and may be so disposed on said horizontal arm as to be engageable at any arbitrary point on that portion of the free end of the lever on the side of said axial point opposite said one end of the lever.

6. A vehicle load-responsive linking device according to claim 1, characterized in that the stop member is disposed on a bracket carried by the brake pressure regulator and in the path of angular displacement of an extended portion of the lever extending beyond the pivotally supported end oppositely to said free end.

7. A vehicle load-responsive linking device according to claim 6, characterized in that said one end of said lever is pivotally supported in a hook-shaped bearing disposed on the brake pressure regulator.

8. A vehicle load-responsive linking device according to claim 1 further characterized by a protective flexible boot sealingly surrounding said one end of said piston rod and sealingly engaged by said one end of said lever for protecting the piston rod.

* * * * *